(12) United States Patent
Sung et al.

(10) Patent No.: US 10,551,795 B2
(45) Date of Patent: Feb. 4, 2020

(54) SPATIAL LIGHT MODULATOR PROVIDING IMPROVED IMAGE QUALITY AND HOLOGRAPHIC DISPLAY APPARATUS INCLUDING THE SAME

(71) Applicant: SAMSUNG ELECTRONICS CO., LTD., Suwon-si (KR)

(72) Inventors: Geeyoung Sung, Daegu (KR); Jungkwuen An, Cheonan-si (KR); Hongseok Lee, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 49 days.

(21) Appl. No.: 15/169,849

(22) Filed: Jun. 1, 2016

(65) Prior Publication Data

US 2016/0349702 A1 Dec. 1, 2016

(30) Foreign Application Priority Data

Jun. 1, 2015 (KR) .................. 10-2015-0077488

(51) Int. Cl.
*G03H 1/26* (2006.01)
*G03H 1/02* (2006.01)
*G03H 1/04* (2006.01)

(52) U.S. Cl.
CPC .............. *G03H 1/268* (2013.01); *G03H 1/02* (2013.01); *G03H 1/0443* (2013.01); *G03H 2001/0224* (2013.01); *G03H 2223/12* (2013.01); *G03H 2223/13* (2013.01); *G03H 2223/19* (2013.01)

(58) Field of Classification Search
CPC ........ G03H 1/268; G03H 1/02; G03H 1/0443; G03H 1/2294; G03H 2001/0224; G03H 2001/2239; G03H 2001/2242; G03H 2223/12; G03H 2223/13; G03H 2223/19; G03H 2225/55; G03H 2240/61; G02F 1/133512; G02F 2203/12
USPC .......................................................... 359/10
See application file for complete search history.

(56) References Cited

U.S. PATENT DOCUMENTS

| | | | |
|---|---|---|---|
| 6,104,446 A * | 8/2000 | Blankenbecler | G02F 1/133621 349/5 |
| 8,111,445 B2 | 2/2012 | Chui et al. | |
| 2005/0225575 A1* | 10/2005 | Brown Elliott | G02F 1/133514 345/694 |

(Continued)

FOREIGN PATENT DOCUMENTS

| | | |
|---|---|---|
| JP | 2009-104037 A | 5/2009 |
| KR | 10-2007-0016478 A | 2/2007 |
| KR | 10-2014-0027812 A | 3/2014 |

OTHER PUBLICATIONS

Communication dated Oct. 13, 2016 issued by European Patent Office in counterpart European Application No. 16172380.4.

(Continued)

*Primary Examiner* — George G King
(74) *Attorney, Agent, or Firm* — Sughrue Mion, PLLC

(57) ABSTRACT

A spatial light modulator providing an expanded viewing window and a holographic display apparatus including the spatial light modulator are provided. The spatial light modulator includes a mask member having a periodic pattern that is arranged to split an area of each of a plurality of pixels into at least two portions such that a space between lattice spots formed by a period structure of the spatial light modulator increases.

21 Claims, 12 Drawing Sheets

(56) References Cited

U.S. PATENT DOCUMENTS

| | | | |
|---|---|---|---|
| 2006/0012733 A1* | 1/2006 | Jin | G02F 1/13336 |
| | | | 349/73 |
| 2007/0109617 A1 | 5/2007 | Cable et al. | |
| 2007/0206139 A1 | 9/2007 | Iijima | |
| 2010/0067075 A1 | 3/2010 | Schwerdtner | |
| 2010/0277566 A1 | 11/2010 | Cable et al. | |
| 2011/0216277 A1* | 9/2011 | Chen | G02F 1/1335 |
| | | | 349/117 |
| 2013/0155504 A1* | 6/2013 | Kim | G02B 27/2214 |
| | | | 359/464 |
| 2014/0055830 A1 | 2/2014 | Pyun et al. | |
| 2015/0185381 A1* | 7/2015 | Wu | G02B 5/201 |
| | | | 349/106 |
| 2015/0309322 A1* | 10/2015 | Shen | G02B 27/26 |
| | | | 349/15 |

OTHER PUBLICATIONS

Song et al., "Holographic Display with a FPD-based Complex Spatial Light Modulator", Optomechatronic Micro/Nano Devices III, Oct. 8-10, 2007, 6 pages total, pp. 89770N-1-89770N-6, vol. 8977, SPIE, Lausanne, Switzerland.

* cited by examiner

SPATIAL LIGHT MODULATOR PROVIDING IMPROVED IMAGE QUALITY AND HOLOGRAPHIC DISPLAY APPARATUS INCLUDING THE SAME

CROSS-REFERENCE TO RELATED APPLICATION

This application claims priority from Korean Patent Application No. 10-2014-0077488, filed on Jun. 1, 2015 in the Korean Intellectual Property Office, the disclosure of which is incorporated herein by reference in its entirety.

BACKGROUND

1. Field

Apparatuses and methods consistent with exemplary embodiments relate to a spatial light modulator and a holographic display apparatus including the spatial light modulator, and more particularly to, a spatial light modulator providing improved image quality and a holographic display apparatus including the spatial light modulator.

2. Description of the Related Art

Glass-required three-dimensional (3D) technology and glasses-free 3D technology are widely used to present a 3D image. Examples of the glass-required three-dimensional (3D) technology include deflected glasses-type methods and shutter glasses-type methods. Examples of the glasses-free 3D technology include lenticular methods and parallax barrier methods. These methods use binocular parallax and increasing the number of viewpoints is limited. In addition, these methods may make the viewers feel tired due to the difference between the depth perceived by the brain and the focus of the eyes.

Recently, holographic display methods have been suggested to have the brain feel consistency between the perceived depth and the focus of the eyes. According to a holographic display technique, when reference light is emitted onto a hologram pattern having recorded thereon an interference pattern obtained by interference between object light reflected from an original object and the reference light, the reference light is diffracted and an image of the original object is reproduced. When a currently commercialized holographic display technique is used, a computer-generated hologram (CGH), rather than a hologram pattern obtained by directly exposing an original object to light, is provided as an electric signal to a spatial light modulator. Then, the spatial light modulator forms a hologram pattern and diffracts reference light according to the input CGH signal, thereby generating a 3D image.

SUMMARY

Exemplary embodiments address at least the above problems and/or disadvantages and other disadvantages not described above. Also, the exemplary embodiments are not required to overcome the disadvantages described above, and may not overcome any of the problems described above.

According to an aspect of an exemplary embodiment, there is provided a spatial light modulator including: a two-dimensional (2D) array of a plurality of pixels; and a mask member having a periodic pattern that is arranged to split an area of each of the plurality of pixels into at least two portions.

A pattern pitch of the pattern of the mask member may be the same as a pixel pitch of the plurality of pixels.

A pattern pitch of the pattern of the mask member may be substantially equal to 1/N of a pixel pitch of the plurality of pixels, N being an integer value.

The pattern of the mask member may have a first pattern pitch in a first direction and a second pattern pitch in a second direction perpendicular to the first direction.

A ratio between the first pattern pitch of the pattern of the mask member and a pixel pitch of the plurality of pixels in the first direction may be substantially equal to a ratio between the second pattern pitch of the pattern of the mask member and a pixel pitch of the plurality of pixels in the second direction.

A ratio between the first pattern pitch of the pattern of the mask member and a pixel pitch of the plurality of pixels in the first direction may be different from a ratio between the second pattern pitch of the pattern of the mask member and a pixel pitch of the plurality of pixels in the second direction.

The first pattern pitch of the pattern of the mask member may be substantially equal to 1/N of a pixel pitch of the plurality of pixels in the first direction, and the second pattern pitch of the pattern of the mask member may be substantially equal to 1/N of a pixel pitch of the plurality of pixels in the second direction, N being an integer value.

The spatial light modulator may further include: a black matrix arranged between the plurality of pixels. A pattern width of the mask member may be substantially equal to a pattern width of the black matrix.

The spatial light modulator may further include: a black matrix arranged between the plurality of pixels. The periodic pattern of the mask member may have a first pattern and a second pattern. A width of the first pattern is equal to a pattern width of the black matrix, and a width of the second pattern is different from the pattern width of the black matrix.

The spatial light modulator may further include: a black matrix arranged between the plurality of pixels. The periodic pattern of the mask member may be arranged between patterns of the black matrix and extends in a direction parallel to the patterns of the black matrix.

The periodic pattern of the mask member may include an opaque black mask that blocks transmission of light.

The mask member may be in each of the plurality of pixels.

The spatial light modulator may further include: a black matrix arranged between the plurality of pixels. The mask member may be disposed on a layer on which the black matrix is disposed.

The mask member may be disposed on an external surface of the spatial light modulator.

The mask member may include a transparent film on which the periodic pattern is printed.

The periodic pattern of the mask member may include a phase mask having a phase delay pattern that delays a phase of transmittance light.

The mask member may include a first area having a first thickness and a second area having a second thickness different from the first thickness.

The mask member may include a first area having a first refractive index and a second area having a second refractive index different from the first refractive index.

The mask member may include a first mask member having a periodic opaque pattern that blocks transmission of light and a second area having a periodic phase delay pattern that delays a phase of transmittance light.

The periodic opaque pattern of the first mask member may have a shape different from a shape of the periodic phase delay pattern of the second mask member.

A shape of the periodic opaque pattern of the first mask member and a shape of the periodic phase delay pattern of the second mask member may be of a same shape. The periodic opaque pattern of the first mask member and the periodic phase delay pattern of the second mask member may be disposed at different locations with respect to each of the plurality of pixels.

According to an aspect of another exemplary embodiment, there is provided a holographic display apparatus including: a light source configured to emit light; a spatial light modulator that includes an array of a plurality of pixels and is configured to diffract the light incident on the spatial light modulator to reproduce a hologram image; and a mask member having a periodic pattern that is arranged to split an area of each of the plurality of pixels into at least two portions.

The spatial light modulator and the mask member may be configured such that a size of a viewing window defined as a space between a plurality of lattice spots formed by a periodic structure of the spatial light modulator and the mask member is at least 2 times greater than a size of an image window of a hologram image reproduced by the holographic display apparatus.

BRIEF DESCRIPTION OF THE DRAWINGS

The above and/or other aspects will be more apparent by describing certain exemplary embodiments, with reference to the accompanying drawings, in which.

DETAILED DESCRIPTION

Figure 1:
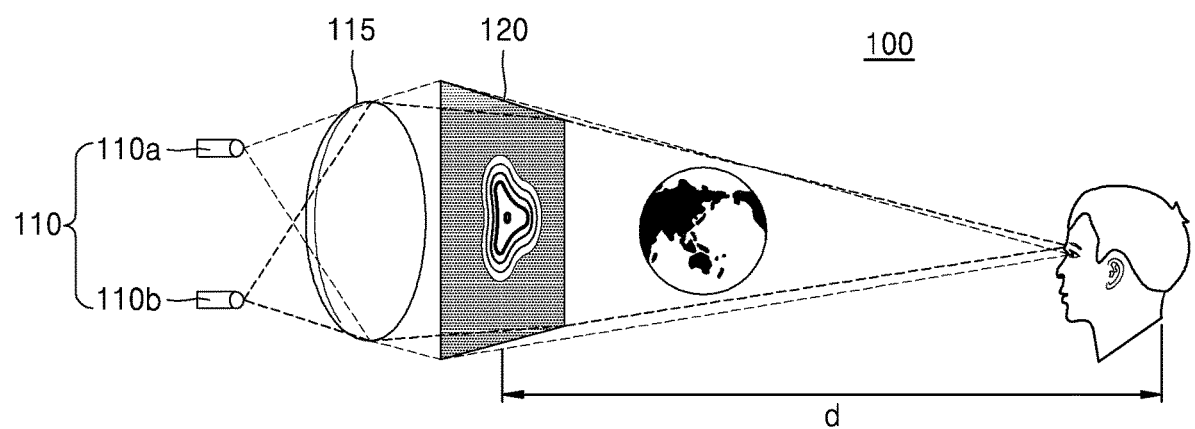
FIG. 1 is a diagram schematically showing a structure of a holographic display apparatus according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

In a layer structure described below, an expression "above" or "on" may include not only "immediately on in a contact manner" but also "on in a non-contact manner".

FIG. 1 is a diagram schematically showing a structure of a holographic display apparatus 100 according to an exemplary embodiment.

Referring to FIG. 1, the holographic display apparatus 100 according to an exemplary embodiment may include a light source 110 providing light and a spatial light modulator 120 forming a hologram pattern to modulate incident light. The holographic display apparatus 100 may further include a Fourier lens 115 that allows the light modulated by the spatial light modulator 120 to be focused in a predetermined space. The modulated light may be focused on the predetermined space by the Fourier lens 115, and thus a hologram image may be reproduced in space. The light may be converged by the Fourier lens 115, and thus a viewing angle of the reproduced hologram image may increase. However, if the light source 110 provides collimated convergence light, the Fourier lens 115 may be omitted.

The light source 110 may be a laser source that provides light having a high spatial coherence to the spatial light modulator 120. However, if the light provided by the light source 110 has a certain degree of spatial coherence, since the light may be sufficiently diffracted and modulated by the spatial light modulator 120, a light-emitting diode (LED) may be used as the light source 110. For example, the light source 110 may include an array of a plurality of lasers or LEDs. In addition to the laser source or the LED, any other light sources may be used as the light source 110 as long as light having spatial coherence is emitted.

Meanwhile, if the holographic display apparatus 100 employs a binocular hologram method of providing a right eye hologram image and a left eye hologram image respectively having viewpoints corresponding to both eyes of an observer, i.e. a right eye viewpoint and a left eye viewpoint, the light source 110 may include a right eye light source 110a and a left eye light source 110b. For example, the right eye light source 110a may provide a right eye viewing zone of the observer with light, and the left eye light source 110b may provide a left eye viewing zone of the observer with light. Therefore, if the light emitted by the right eye light source 110a is modulated by the spatial light modulator 120, the right eye hologram image may be formed in the right eye viewing zone of the observer. If the light emitted by the left eye light source 110b is modulated by the spatial light modulator 120, the left eye hologram image may be formed in the left eye viewing zone of the observer. Each of the eye light source 110a and the left eye light source 110b may include the array of the plurality of lasers or LEDs. Although the eye light source 110a and the left eye light source 110b are separately illustrated in FIG. 1 for convenience of description, one backlight panel including the array of LEDs may be used to provide the right eye viewing zone and the left eye viewing zone with light.

The spatial light modulator 120 may form a hologram pattern for diffracting and modulating the incidence light, according to a hologram data signal provided by a processor. The light spatial modulator 120 may use a phase modulator that performs phase modulation or an amplitude modulator that performs amplitude modulation. Although the spatial light modulator 120 of FIG. 1 is a transmissive spatial light modulator, a reflective spatial light modulator may also be used. The transmissive light spatial modulator may use, for example, a light modulator using a liquid crystal device (LCD) or a semiconductor light modulator based on a compound semiconductor such as GaAs. The reflective spatial light modulator may use, for example, a digital micromirror device (DMD), a liquid crystal on silicon (LCoS), or a semiconductor light modulator.

Figure 2:
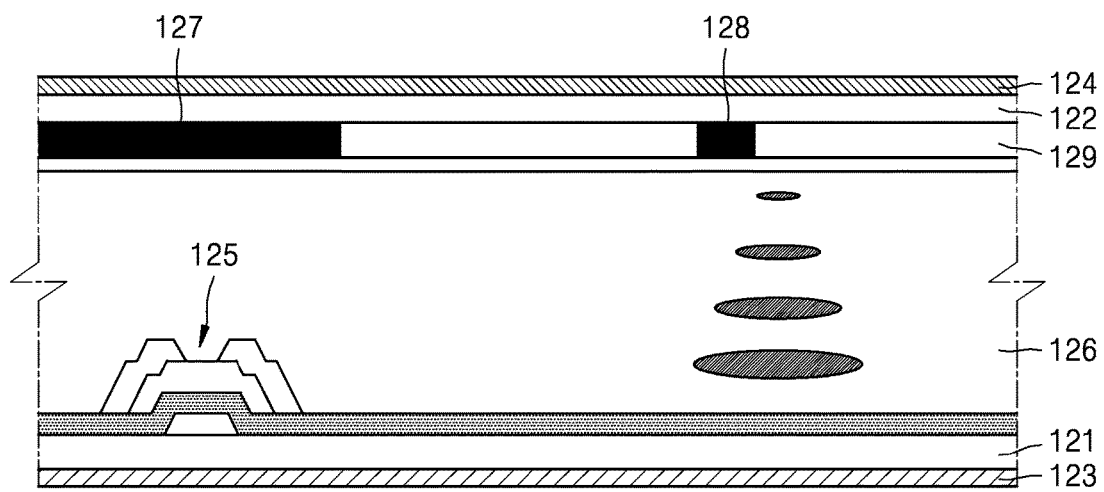
FIG. 2 is a cross-sectional view schematically showing a structure of a pixel of a spatial light modulator according to an exemplary embodiment.

The spatial light modulator 120 according to the present exemplary embodiment may provide the same effect as reducing a pixel pitch without increasing resolution. For example, FIG. 2 is a cross-sectional view schematically showing a structure of a pixel of the spatial light modulator 120 according to an exemplary embodiment. Hereinafter, although the structure of the pixel of the spatial light modulator 120 is described for the case when the spatial light modulator 120 includes an LCD according to an exemplary embodiment, the same principle may apply when the spatial light modulator 120 includes other light modulation device.

Referring to FIG. 2, the spatial light modulator 120 may include, for example, a first transparent substrate 121 and a second transparent substrate 122 that are disposed to face each other, a liquid crystal cell 126 disposed between the first transparent substrate 121 and the second transparent substrate 122, a driving circuit 125 disposed on the first transparent substrate 121 and driving the liquid crystal cell 126, an opaque black matrix 127 disposed on the second transparent substrate 122 and blocking light such that the driving circuit 125 may not be seen, and a mask member 128 disposed on the second transparent substrate 122 and splitting the liquid crystal cell 126. The spatial light modulator 120 may further include a first polarizing plate 123 disposed on an external surface of the first transparent substrate 121 and a second polarizing plate 124 disposed on an external surface of the second transparent substrate 122.

Although only one pixel of the spatial light modulator 120 is illustrated in FIG. 2 for convenience of description, the spatial light modulator 120 may include a two-dimensional (2D) array of a plurality of pixels. The black matrix 127 may be disposed between a plurality of pixels of the spatial light modulator 120. The mask member 128 may be disposed on the same layer as the black matrix 127 on the second transparent substrate 122. A light transmittance layer 129 may be placed in an area facing the liquid crystal cell 126 on the second transparent substrate 122 such that light modulated by the liquid crystal cell 126 may pass through the light transmittance layer 129. The light transmittance layer 129 may be replaced with a color filter which selectively transmits light of different wavelengths. The mask member 128 may be disposed in the area facing the liquid crystal cell 126 and may split the light transmittance layer 129.

As shown in FIG. 2, the mask member 128 is disposed on the same layer as the black matrix 127, and thus the mask member 128 and the black matrix 127 may be simultaneously formed during a same process when the spatial light modulator 120 is manufactured. However, the mask member 128 and the black matrix 127 may not be necessarily disposed on the same layer. For example, the mask member 128 may be disposed in the liquid crystal cell 126 or may be disposed on the same layer as the driving circuit 125 on the first transparent substrate 121. That is, the mask member 128 may be disposed on any layers inside the spatial light modulator 120.

As will be described later, the black matrix 127 may act as a pixel lattice that diffracts incidence light and forms unnecessary lattice spots. The lattice spots formed by the black matrix 127 may function as noise and deteriorate quality of a hologram image. According to an exemplary embodiment, spaces between the lattice spots may be increased in order to reduce an influence of the lattice spots on the reproduced hologram image. The higher the resolution of the spatial light modulator 120, the smaller the pitch of the pixel. The smaller the spaces between the black matrixes 127, the larger the spaces between the lattice spots. However, there is a technical limitation to an increase in the resolution of the spatial light modulator 120. The mask member 128, along with the black matrix 127, may function as the pixel lattice to increase spaces between the lattice spots without reducing the pixel pitch of the pixel (i.e. while not increasing the resolution of the spatial light modulator 120).

Figure 3:
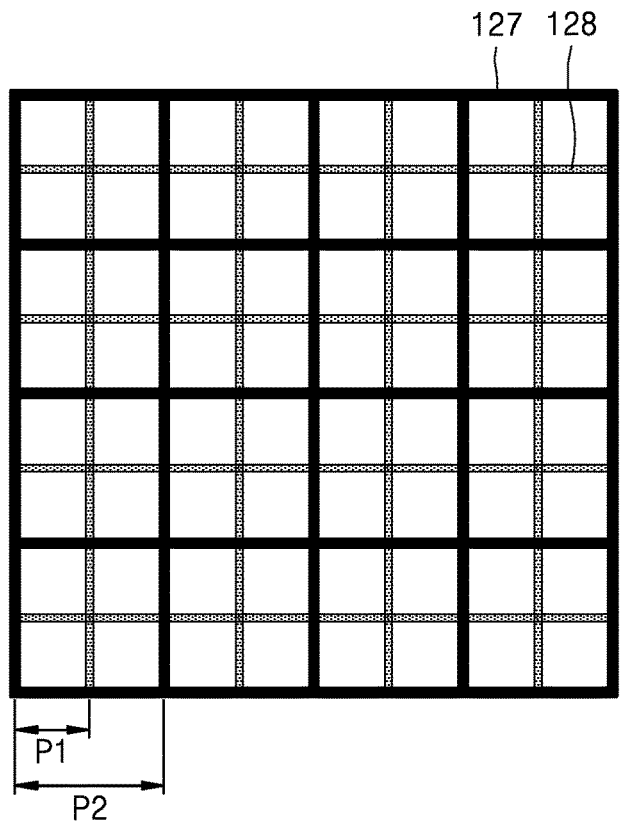
FIG. 3 is a plan view schematically showing a relative location relationship between black matrixes and mask members of a spatial light modulator according to an exemplary embodiment.

FIG. 3 is a plan view schematically showing a relative location relationship between the black matrixes 127 and the mask members 128 of the spatial light modulator 120 according to an exemplary embodiment. The spatial light modulator 120 may include a two-dimensional (2D) array of a plurality of pixels. A inter-pixel gap exists between the plurality of pixels. A black matrix 127 surrounds the boundaries of each of the plurality of pixels to fill in the inter-pixel gap. A mask member 128 may divide an area of each of the plurality of pixels into, for example, four sub-areas. As a result, it is possible to have the same effect as reducing a pixel pitch of the plurality of pixels by half without actually reducing the pixel pitch of the plurality of pixels. The pixel pitch may refer to a center-to-center spacing between two adjacent pixels among the plurality of pixels. The Inter-pixel gap may refer to an edge-to-edge spacing between two adjacent pixels among the plurality of pixels.

Referring to FIG. 3, the black matrixes 127 may have periodic lattice type patterns. The mask members 128 may also have the periodic lattice type patterns, like the black matrixes 127, and may be disposed to shift with respect to the black matrixes 127 to split each pixel. Thus, periodic patterns of the mask members 128 may be disposed between patterns of the black matrixes 127 and may extend in a direction in parallel to the patterns of the black matrixes 127.

FIG. 3 illustrates that the periodic patterns of the mask members 128 may be the same as the patterns of the black matrixes 127 but the exemplary embodiments are not limited thereto. Pitches of the periodic patterns of the mask members 128 may be the same as or different from pitches of the patterns of the black matrixes 127. For example, although FIG. 3 illustrates that each pixel is split into four portions by the periodic patterns of the mask members 128, the periodic patterns of the mask members 128 may split each pixel into two portions or more than six portions. In this regard, splitting may be understood not as physical splitting of a pixel but as virtual splitting of an image display area of the pixel into several sections by the mask members 128. As shown in FIG. 3, although the pitches of the mask member 128 and the black matrix 127 are P2, since the mask member 128 and the black matrix 127 co-act as pixel lattices, the same effect as reducing pitches of the pixel lattices to P1 is achieved, and thus spaces between lattices spots may increase.

The operation of the above-described holographic display apparatus 100 will now be described below. A processor may generate and provide a hologram data signal to the spatial light modulator 120. The hologram data signal may be a computer-generated hologram (CGH) signal that is computed to reproduce a target hologram image on a space. The processor may generate the hologram data signal according to the hologram image that is to be reproduced. The spatial light modulator 120 may form a hologram pattern on a surface of the spatial light modulator 120 according to the hologram data signal provided from the processor. A principle that the spatial light modulator 120 forms the hologram pattern may be the same as a principle that, for example, a display panel displays an image. For example, the hologram pattern may be displayed on the spatial light modulator 120 as an interference pattern including information regarding the hologram image that is to be reproduced.

Simultaneously, the light source 110 may provide light to the spatial light modulator 120. Incidence light may be diffracted and interfered by the hologram pattern formed by the spatial light modulator 120, and thus a three-dimensional hologram image may be reproduced on a predetermined space in front of the spatial light modulator 120. A distance between the space in which the reproduced hologram image is located and the spatial light modulator 120 may be referred to as a depth. In general, a shape and the depth of the reproduced hologram image may be determined according to the hologram pattern formed by the spatial light modulator 120. When the hologram image is reproduced, an observer may appreciate the hologram image located away from the spatial light modulator 120 by distance d. In this regard, a virtual plane including observer's pupils at a viewing position in which the hologram image may be appreciated may be referred to as a pupil plane.

However, the spatial light modulator 120 is configured as an array of a plurality of pixels, and thus the array of the plurality of pixels function as a lattice. Thus, the incidence light may be diffracted and interfered by the hologram pattern formed by the spatial light modulator 120 and also by a pixel lattice configured as the array of the pixels of the spatial light modulator 120. Also, a part of the incidence light may pass through the spatial light modulator 120 without being diffracted by the hologram pattern. As a result, a plurality of lattice spots may appear on the pupil plane on which the hologram image is collected as a spot. The plurality of lattice spots may function as image noise that deteriorates quality of the hologram image and may make it inconvenient to appreciate the hologram image.

The plurality of lattice spots may be generated due to an internal structure of the spatial light modulator 120 and is unrelated to the hologram pattern, and thus the plurality of lattice spots are positioned at a fixed location. However, a location of the hologram image on the pupil plane may vary according to the hologram pattern, and thus the hologram pattern may be formed such that the hologram image may be reproduced at a location where the plurality of lattice spots is not present. According to this principle, to prevent the plurality of lattice spots from being seen by the observer at the viewing position, the hologram image may be reproduced in order to prevent an area (hereinafter referred to as an image window) on which the hologram image is focused on the pupil plane from overlapping the plurality of lattice spots. Such a reproduction technique is usually referred to an off-axis technique.

However, when the hologram image is reproduced via the off-axis technique, if a general spatial light modulator is used, since an area (hereinafter referred to as a viewing window) including no lattice spot surrounded by the plurality of lattice spots is small due to a limited resolution of the general spatial light modulator, it is difficult to completely avoid an influence of the lattice spots. For example, a width w of the viewing window may be proportional to a distance d between the general spatial light modulator and the viewing position and a wavelength $\lambda$ of light and may be inversely proportional to a pixel pitch p of the general spatial light modulator. That is, a relationship $w=\lambda \cdot d/p$ may be established. Thus, although increasing a size of the viewing window by sufficiently reducing the pixel pitch p of the general spatial light modulator may be considered, reduction of the pixel pitch p of the general spatial light modulator is technically limited. Moreover, when the lattice spots are diffused due to aberration of the Fourier lens 115, even though the image window is located so that the lattice spots are avoided, noise may occur in the hologram image due to light diffused from the lattice spots.

Figure 4:
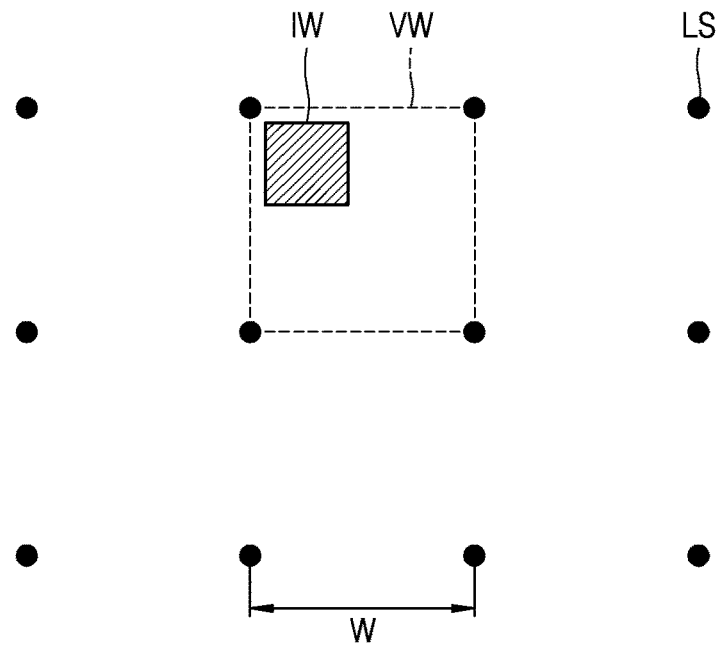
FIG. 4 schematically illustrates a relationship between a viewing window and an image window that are formed by the mask members of FIG. 3 according to an exemplary embodiment.

The spatial light modulator 120 according to the present exemplary embodiment may provide the same effect as reducing the pixel pitch p using the mask member 128 without increasing resolution, as described above, thereby providing a viewing window having a sufficiently expanded size. For example, FIG. 4 schematically illustrates a relationship between the viewing window VW and the image window IW that are formed by the mask members 128 of FIG. 3 according to an exemplary embodiment. Referring to FIG. 4, a plurality of lattice spots LS may be generated by diffraction and interference of incident light caused by the mask member 128 and the black matrix 127 at uniform intervals from each other. As indicated with a broken line box of FIG. 4, an area surrounded by the plurality of lattice spots LS is the viewing window VW. The image window IW that is an area in which a hologram image is focused on a pupil plane may be located in the viewing window VW. When a pupil location of an observer is identical to a location of the image window IW, the observer may appreciate a perfect hologram image.

The mask member 128 may provide the same effect as reducing a pitch of a pixel lattice, and thus the width w of the viewing window VW is greater than that of the image window IW. Since pixels of the spatial light modulator 120 are not reduced, the size of the image window IW does not change. For example, when the mask member 128 splits each pixel into four portions, a size of the viewing window VW may be approximately four times greater than a size of the image window IW. Although FIG. 4 illustrates that the image window IW is located at one corner of the viewing window VW, a location of the image window IW may be adjusted according to a hologram patterns formed by the spatial light modulator 120. As described above, the holographic display apparatus 100 may reproduce a hologram image inside the expanded viewing window VW, thereby inhibiting quality of the hologram image from deteriorating due to the lattice spots LS. Thus, the holographic display apparatus 100 may provide the hologram image having an improved quality.

FIG. 4 illustrates the viewing window VW with respect to a case where periodic patterns of the mask members 128 have the same shapes as those of the black matrixes 127. However, as described above, shapes of the periodic patterns of the mask members 128 may be selected in various ways. For example, the shapes of the periodic patterns of the mask member 128 may be selected according to a desired size of the viewing window VW.

Figure 5:
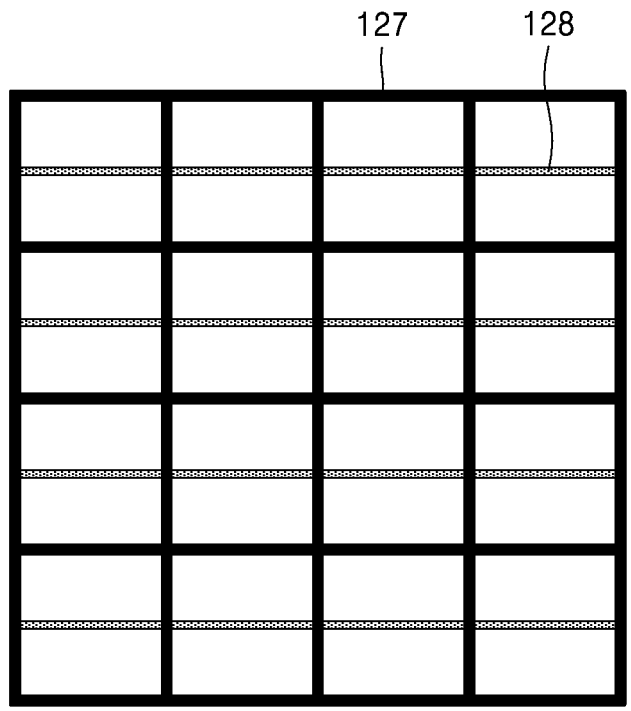
FIG. 5 is a plan view schematically showing a relative location relationship between black matrixes and mask members of a spatial light modulator according to another exemplary embodiment.
Figure 6:
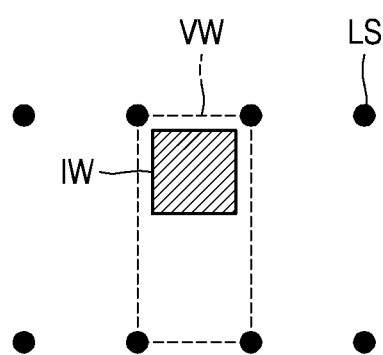
FIG. 6 schematically illustrates a relationship between a viewing window and an image window that are formed by the mask members of FIG. 5 according to an exemplary embodiment.

For example, FIG. 5 is a plan view schematically showing a relative location relationship between the black matrixes 127 and the mask members 128 of the spatial light modulator 120 according to another exemplary embodiment. Referring to FIG. 5, periodic patterns of the mask members 128 may be formed so that each pixel is split into two portions in a vertical direction. That is, the mask members 128 may include a plurality of periodic patterns extending in a horizontal direction. FIG. 6 schematically illustrates a relationship between the viewing window VW and the image window IW that are formed by the mask members 128 of FIG. 5 according to an exemplary embodiment. As shown in FIG. 6, a pitch of a pixel lattice that is commonly formed by the black matrixes 127 and the mask members 128 is reduced to ½ in a vertical direction, and thus a size of the viewing window VW may increase two times in the vertical direction only.

Figure 7:
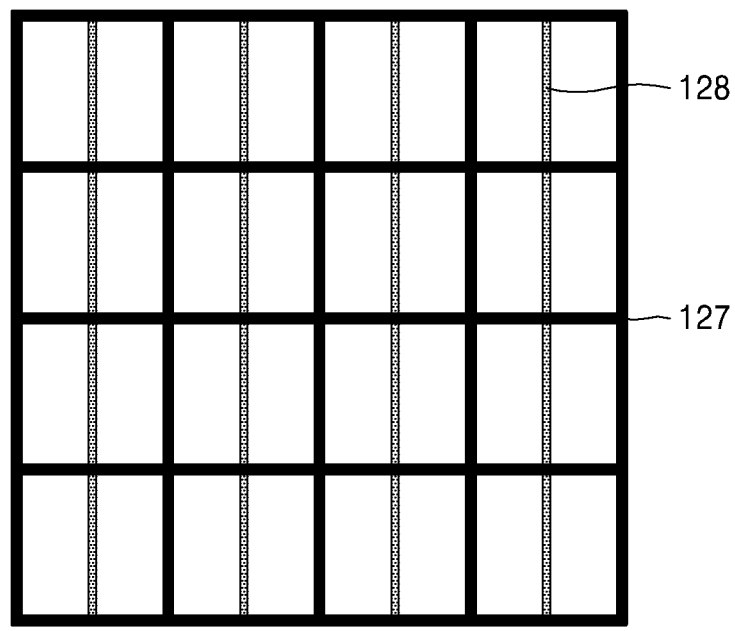
FIG. 7 is a plan view schematically showing a relative location relationship between black matrixes and mask members of a spatial light modulator according to another exemplary embodiment.
Figure 8:
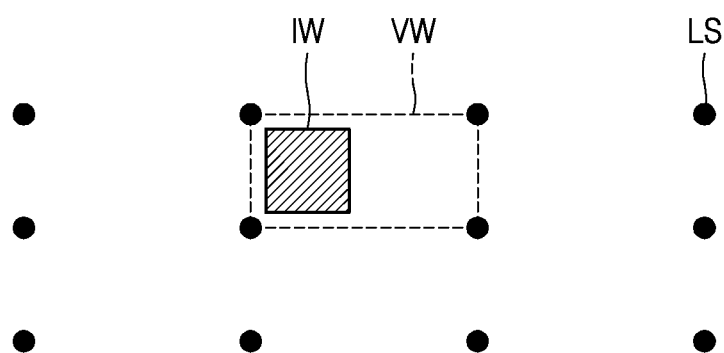
FIG. 8 schematically illustrates a relationship between a viewing window and an image window that are formed by the mask members of FIG. 7 according to an exemplary embodiment.

FIG. 7 is a plan view schematically showing a relative location relationship between the black matrixes 127 and the mask members 128 of the spatial light modulator 120 according to another exemplary embodiment. Referring to FIG. 7, periodic patterns of the mask members 128 may be formed so that each pixel is split into two portions in a horizontal direction. That is, the mask members 128 may include a plurality of periodic patterns extending in a vertical direction. FIG. 8 schematically illustrates a relationship between the viewing window VW and the image window IW that are formed by the mask members 128 of FIG. 7 according to an exemplary embodiment. As shown in FIG. 8, a pitch of a pixel lattice that is commonly formed by the black matrixes 127 and the mask members 128 is reduced to ½ in a horizontal direction, and thus a size of the viewing window VW may increase two times in the horizontal direction only.

As described above, a pattern pitch of the periodic patterns of the mask members 128 may be selected to be the same as or different from a pixel pitch of pixels of the spatial light modulator 120. In order for the mask member 128 to equally split each pixel into two or more portions, the pattern pitch of the periodic patterns of the mask members 128 may be the same as 1/integer of the pixel pitch of the pixels of the spatial light modulator 120. In greater detail, the patterns of the mask members 128 may have a first pattern pitch in a horizontal direction and a second pattern pitch in a vertical direction, and a ratio of the first pattern pitch and a pixel pitch of the pixels in the horizontal direction may be different from or may be the same as a ratio of the second pattern pitch and a pixel pitch of the pixels in the vertical direction. For example, the first pattern pitch may be the same as 1/integer of the pixel pitch of the pixels in the horizontal direction, and the second pattern pitch may be the same as 1/integer of the pixel pitch of the pixels in the vertical direction. The patterns of the mask members 128 may have an arbitrary pattern pitch irrespective of the pixel pitch of the pixels.

A case where the hologram image is formed by convergence light is described above. However, if the spatial light modulator 120 for itself provides a sufficient viewing angle, the convergence light may not be necessarily used. That is, the Fourier lens 115 may be omitted, and the light source 110 may not necessarily provide the convergence light. For example, mere parallel light or divergent light may be used to reproduce a hologram image. When the parallel light or the divergent light is used other than the convergence light, a problem of deterioration of the image quality due to the above-described lattice spots may be reduced. However, if the hologram image is reproduced using a spatial light modulator that does not include the mask member 128, a crosstalk may occur between a plurality of hologram images.

Figure 9:
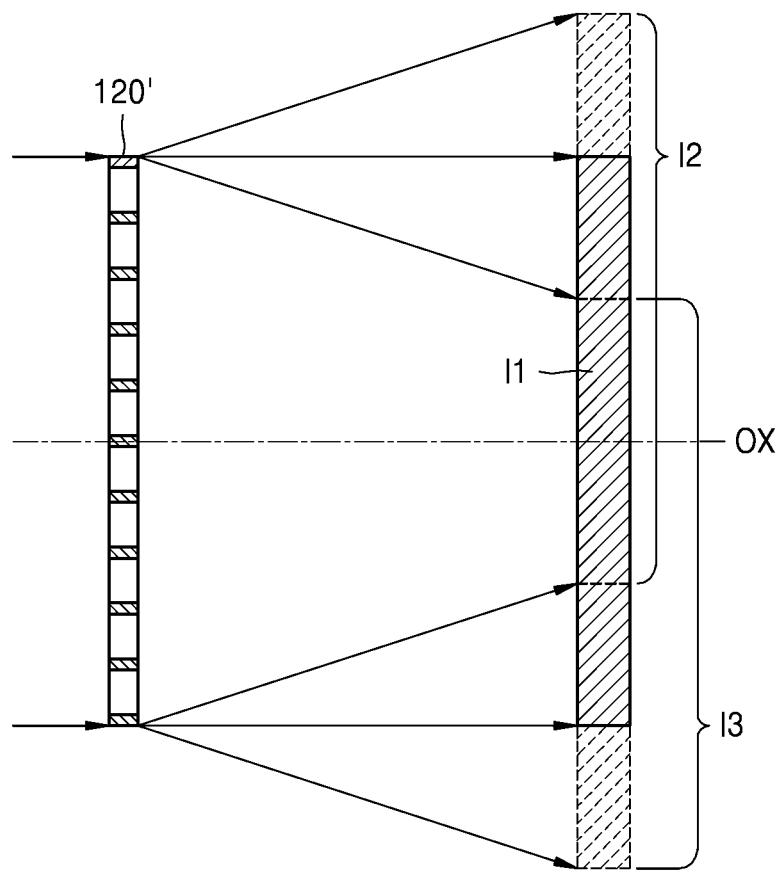
FIG. 9 illustrates exemplarily a crosstalk that occurs between hologram images when a holographic display apparatus that does not use convergence light reproduces the hologram images using a spatial light modulator that does not include a mask member.

For example, FIG. 9 exemplarily illustrates a crosstalk that occurs between hologram images I1, I2, and I3 when a holographic display apparatus that does not use convergence light reproduces the hologram images I1, I2, and I3 using a spatial light modulator 120' that does not include the mask member 128. The hologram images I1, I2, and I3 may be referred to as a 0th order hologram image, a +1st order hologram image, and a −1st order hologram image, respectively. As shown in FIG. 9, when parallel light is incident into the spatial light modulator 120', the $0^{th}$ order hologram image I1 may be formed on a light axis OX of the spatial light modulator 120' on a pupil plane. The ±1st order hologram images I2 and I3 may be additionally formed in a direction perpendicular to the light axis OX on the pupil plane. Although FIG. 9 illustrates that the ±1st order hologram images I2 and I3 are formed up and down, a 1st order hologram image may be further formed in a lateral direction. However, if the spatial light modulator 120' does not modulate incident light to have a sufficiently large diffraction angle, the crosstalk between the $0^{th}$ order hologram image I1 and the ±1st order hologram images I2 and I3 may occur on the pupil plane. As a result, quality of the $0^{th}$ order hologram image I1 and the ±1st order hologram images I2 and I3 may deteriorate.

Figure 10:
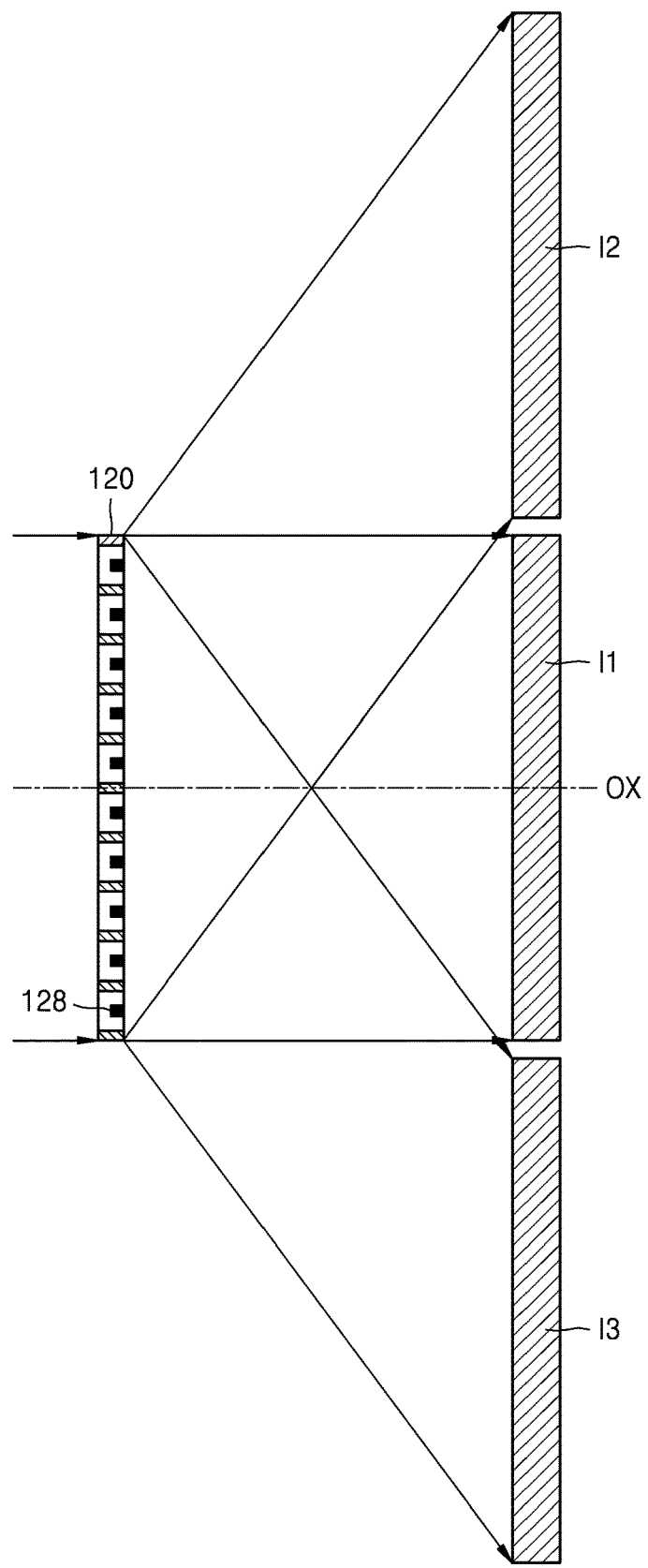
FIG. 10 is an example diagram for describing a case where a holographic display apparatus that does not use convergence light prevents a crosstalk using a spatial light modulator that includes a mask member.

FIG. 10 is an exemplary diagram for describing a case where a holographic display apparatus that does not use convergence light prevents a crosstalk using the spatial light modulator 120 that includes the mask member 128 according to the present exemplary embodiment. Referring to FIG. 10, since a diffraction angle becomes large due to the spatial light modulator 120 that includes the mask member 128, the ±1st order hologram images I2 and I3 may be moved by a sufficient distance in a direction perpendicular to the light axis OX. Thus, crosstalk between the $0^{th}$ order hologram image I1 and the ±1st order hologram images I2 and I3 may be prevented.

Figure 11:
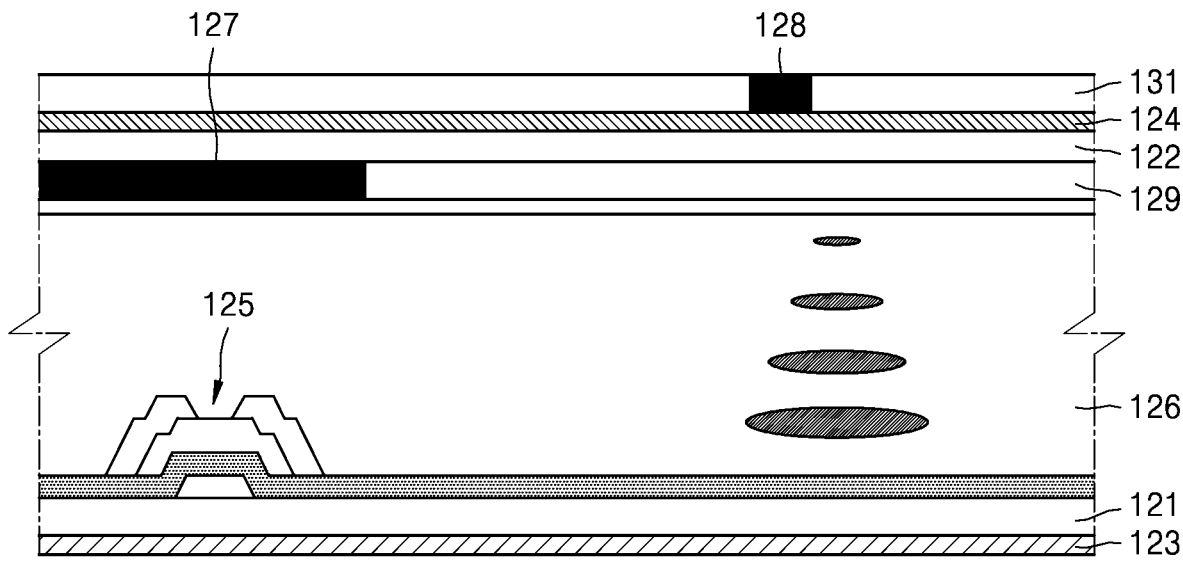
FIG. 11 is a cross-sectional view schematically showing a structure of a pixel of a spatial light modulator according to another exemplary embodiment.

Meanwhile, the mask member 128 is disposed inside the spatial light modulator 120 of FIG. 2 but a location of the mask member 128 is not necessarily limited thereto. For example, FIG. 11 is a cross-sectional view schematically showing a structure of a pixel of the spatial light modulator 120 according to another exemplary embodiment. Referring to FIG. 11, the mask member 128 is not disposed inside the spatial light modulator 120. Instead, the mask member 128 may be disposed on an external surface of the spatial light modulator 120. Although FIG. 11 illustrates that the mask member 128 is disposed adjacent to the second transparent substrate 122, the mask member 128 may be disposed adjacent to the first transparent substrate 121. For example, the mask member 128 may be disposed on an outer surface of the first polarizing plate 123 or inside the first transparent substrate 121.

Periodic patterns of the mask members 128 may be directly printed on the external surface of the spatial light modulator 120. Instead, the mask member 128 may be provided separately from the spatial light modulator 120 so that the mask members 128 may be attached onto the external surface of the spatial light modulator 120. For example, the mask member 128 may be in the form of a transparent film 131 on which the periodic patterns are printed. When the mask member 128 is manufactured in the form of the transparent film 131, the mask member 128 may be attached to an already manufactured existing spatial light modulator.

Figure 12:
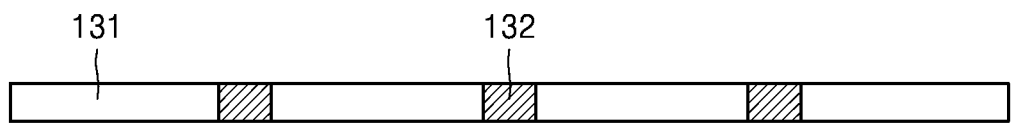
FIG. 12 is a cross-sectional view schematically showing a structure of a mask member of a spatial light modulator according to an exemplary embodiment.

A case where the mask member 128 is an opaque black mask of which periodic patterns do not allow transmission of light has been described above. However, instead of the black mask that completely blocks light, a phase mask that delays a phase of transmittance light may be used. For example, FIG. 12 is a cross-sectional view schematically showing a structure of a mask member 132 of the spatial light modulator 120 according to an exemplary embodiment. Referring to FIG. 12, the mask member 132 according to the present exemplary embodiment may include periodic patterns having a different refractive index from that of a transparent film 131. For example, an area of the transparent film 131 may have a first refractive index, and an area forming periodic patterns of the mask member 132 may have a second refractive index different from the first refractive index.

Figure 13:
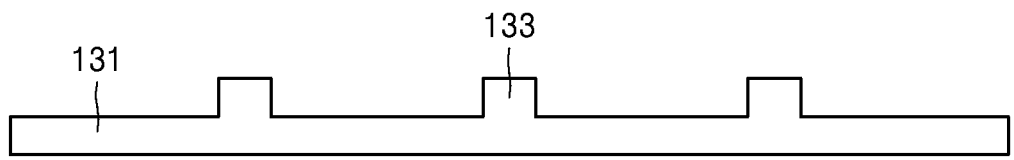
FIG. 13 is a cross-sectional view schematically showing a structure of a mask member of a spatial light modulator according to another exemplary embodiment.

A phase of transmittance light may be delayed by adjusting a thickness instead of a refractive index. For example, FIG. 13 is a cross-sectional view schematically showing a structure of a mask member 133 of the spatial light modulator 120 according to another exemplary embodiment. Referring to FIG. 13, the mask member 133 may include periodic patterns having a different thickness from that of the transparent film 131. In other words, the mask member 133 includes protrusions. For example, an area of the transparent film 131 may have a first thickness, and an area forming the periodic patterns of the mask member 133 may have a second thickness different from the first thickness. FIG. 13 illustrates that the second thickness of the mask member 133 is greater than the first thickness of the transparent film 131 but this is merely an example, and the first thickness may be greater than the second thickness.

Although the mask member 132 and 133 including the phase mask are provided in the form of the transparent film 131 in FIGS. 12 and 13, the mask member 132 and 133 may be disposed inside the spatial light modulator 120, like the mask member 128 including the black mask. For example, the mask member 132 and 133 may be disposed on the same layer as the black matrix 127 inside the spatial light modulator 120. In this case, periodic patterns of the mask member 132 may have a different refractive index from that of the light transmittance layer 129. Alternatively, the periodic patterns of the mask member 132 may have a different thickness from that of the light transmittance layer 129.

Figure 14:
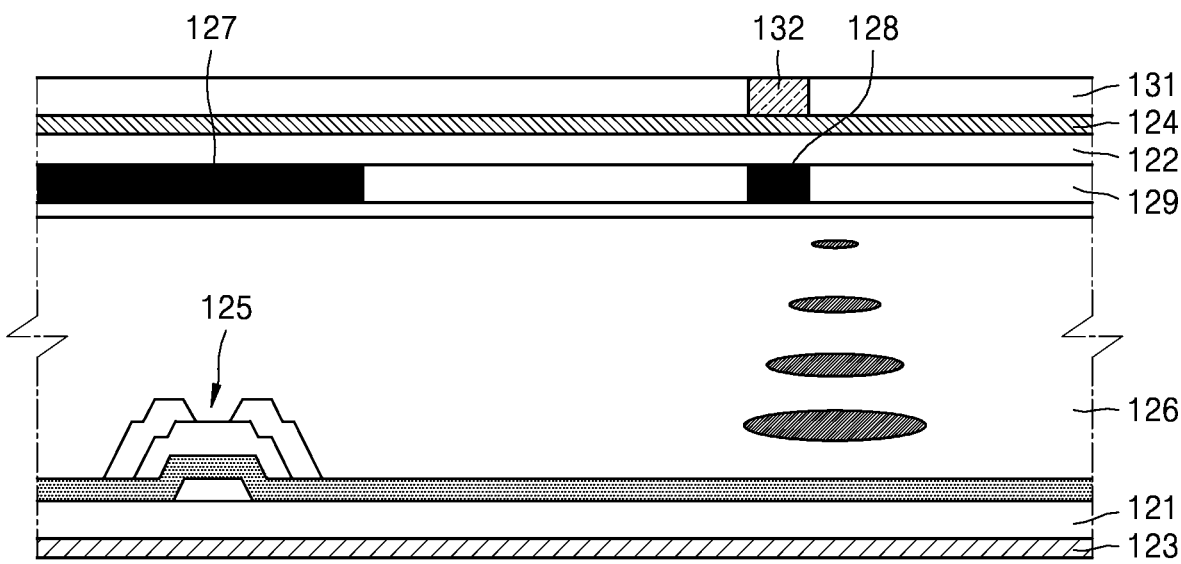
FIG. 14 is a cross-sectional view schematically showing a structure of a pixel of a spatial light modulator according to another exemplary embodiment.

A combination of the mask member 128 including the black mask and the mask members 132 and 133 including the phase mask may be possible. For example, FIG. 14 is a cross-sectional view schematically showing a structure of a pixel of the spatial light modulator 120 according to another exemplary embodiment. As shown in FIG. 14, the mask member 128 including the black mask may be disposed on the same layer as the black matrix 128, and the mask member 132 including the phase mask may be disposed on an external surface of the spatial light modulator 120. However, this is merely an example of various combinations of the mask members 128, 132, and 133. For example, the mask member 128 including the phase mask may be disposed on the same layer as the black matrix 127, and the mask member 128 including the black mask may be disposed on the external surface of the spatial light modulator 120. Alternatively, the mask member 133 of a heterogeneous thickness structure may be disposed, instead of the mask member 132 of a heterogeneous refractive index structure. Alternatively, the mask member 133 of the heterogeneous thickness structure may be disposed, instead of the mask member 128 including the black mask.

FIG. 14 illustrates that the two mask members 128 and 132 may have a same lattice structure. That is, a periodic opaque pattern of the black mask of the mask member 128 and a periodic phase delay pattern of the phase mask of the mask member 132 may have a same shape. However, the present exemplary embodiment is not limited thereto. The periodic opaque pattern of the black mask of the mask member 128 and the periodic phase delay pattern of the phase mask of the mask member 132 may have a different pattern pitch or shape. Alternatively, the periodic opaque pattern of the black mask of the mask member 128 and the periodic phase delay pattern of the phase mask of the mask member 132 may be shifted with each other while having the same shape. In this case, the periodic opaque pattern of the black mask of the mask member 128 and the periodic phase delay pattern of the phase mask of the mask member 132 may be disposed in different locations with respect to each pixel of the spatial light modulator 120.

Various simulations are performed in order to determine an expansion effect of a viewing window by the above-described mask members 128, 132, and 133.

Figure 15:
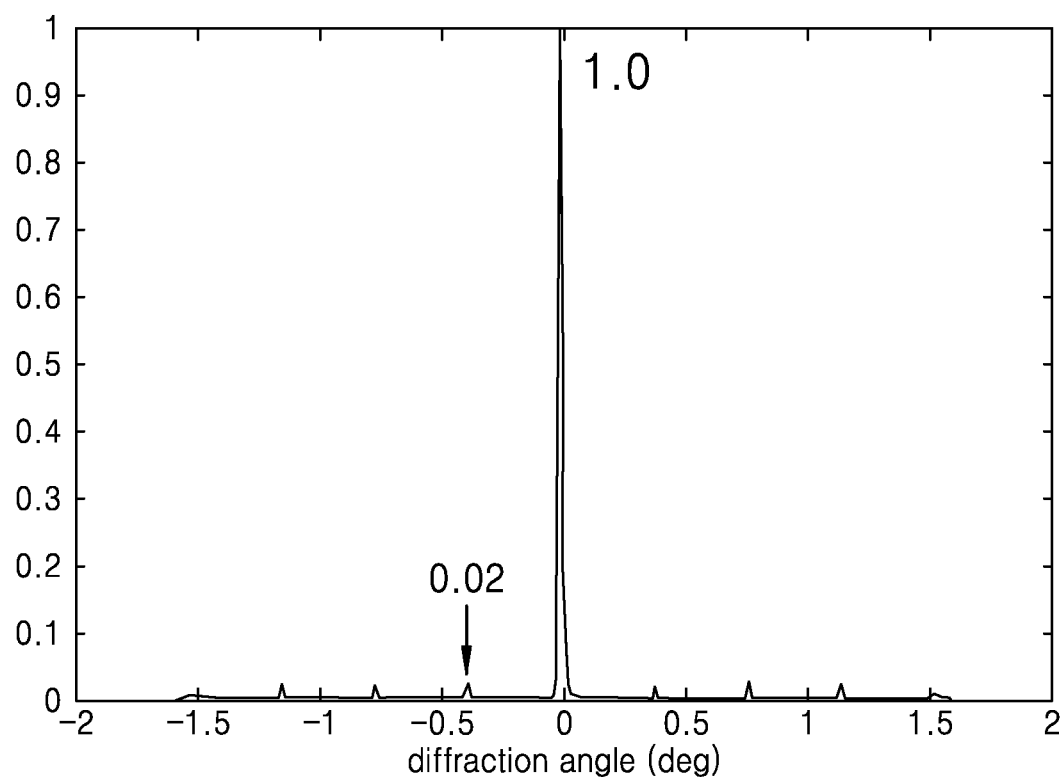
FIG. 15 is a graph showing a simulation result of lattice spots formed by a spatial light modulator according to a comparative example that does not include a mask member.

First, FIG. 15 is a graph showing a simulation result of lattice spots formed by a spatial light modulator according to a comparative example that does not include a mask member. In this regard, it is assumed that a pattern width of the black matrix 127 is 10 μm, and a pixel width between the black matrixes 127 is 70 μm. In the graph of FIG. 15, a light intensity of a lattice spot caused by a $0^{th}$ order diffraction is normalized as 1.0. Referring to FIG. 15, a lattice spot caused by the $0^{th}$ order diffraction appears at 0 degree, that is, in a center part, and lattice spots appear due to a higher order diffraction than ±1$^{st}$ order appear at an interval of about 0.4 degree.

Figure 16:
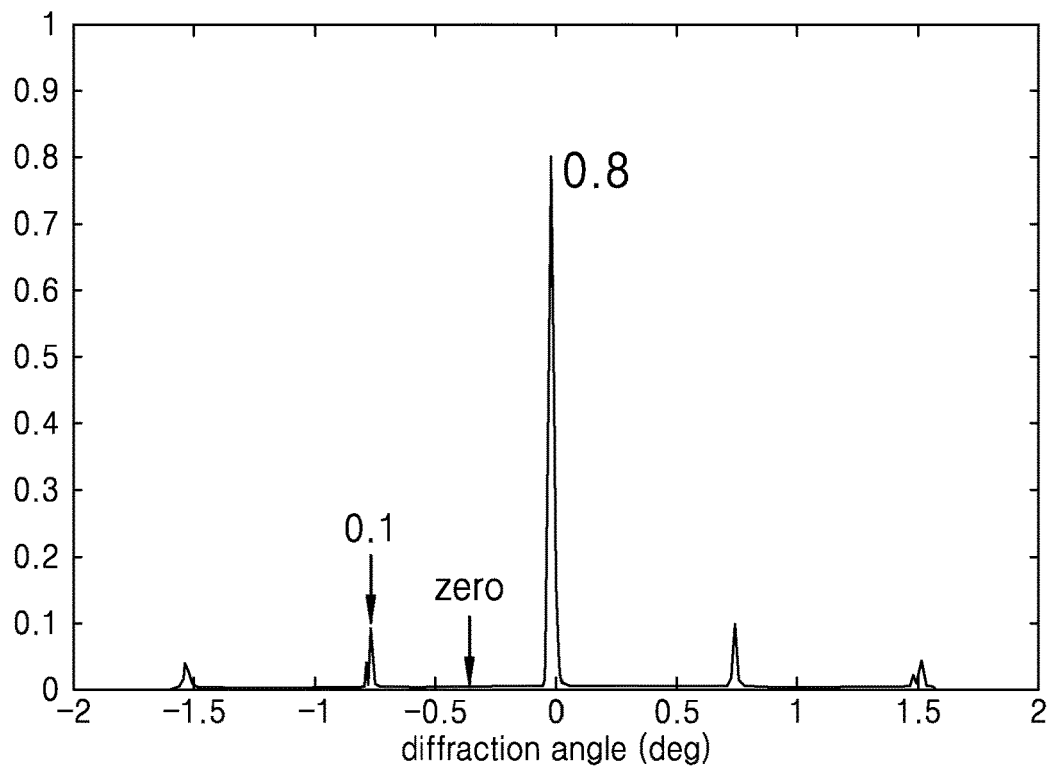
FIGS. 16 and 17 are graphs showing a simulation result of lattice spots formed by a spatial light modulator of FIG. 2.
Figure 17:
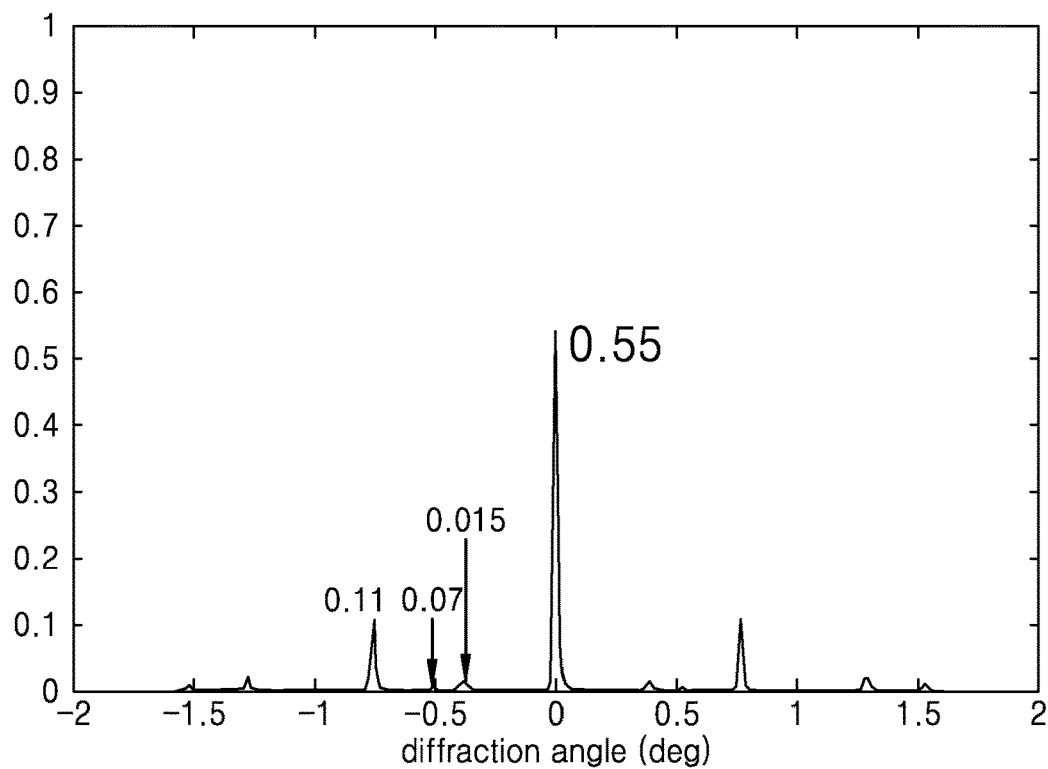

FIGS. 16 and 17 are graphs showing a simulation result of lattice spots formed by the spatial light modulator 120 of FIG. 2. That is, a simulation is performed on the assumption that the mask member 128 including a black mask is disposed on the same layer as the black matrix 127. In FIG. 16, it is assumed that a width of periodic patterns of the mask member 128 is 10 μm that is the same as the pattern width of the black matrix 127, and a space between the mask member 128 and the black matrix 127 is 30 μm. In FIG. 17, it is assumed that the width of periodic patterns of the mask member 128 is 20 μm that is different from the pattern width of the black matrix 127, and the space between the mask member 128 and the black matrix 127 is 25 μm.

Referring to the graph of FIG. 16, a light intensity of a lattice spot caused by a 0$^{th}$ order diffraction is reduced to 0.8, and lattice spots caused by a higher order diffraction than ±1$^{st}$ order appear at an interval of about 0.6 degree. Thus, a width of a viewing window may be expanded by 2 times. Referring to the graph of FIG. 17, the light intensity of the lattice spot caused by the 0$^{th}$ order diffraction is reduced to 0.55, and the lattice spots caused by the higher order diffraction than ±1$^{st}$ order appear at an interval of about 0.8 degree. Thus, the width of the viewing window may be expanded by 2 times. However, two diffraction patterns having a very weak light intensity may remain in the viewing window in FIG. 17.

Figure 18:
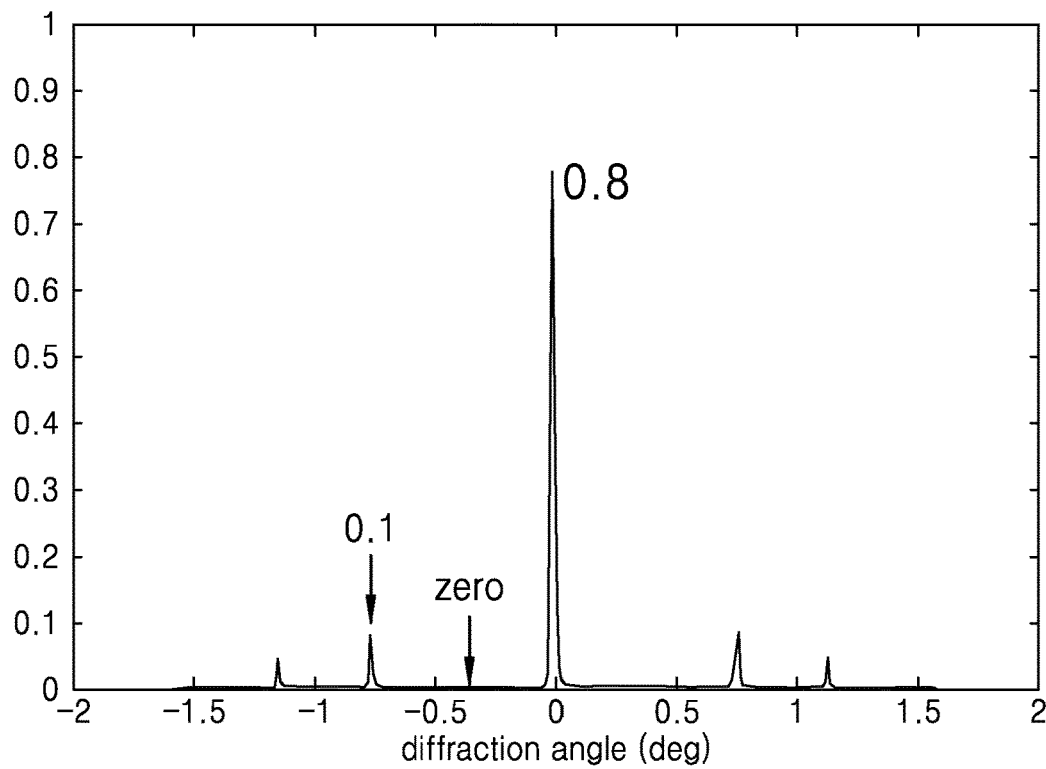
FIGS. 18 and 19 are graphs showing a simulation result of lattice spots formed by a spatial light modulator of FIG. 11.
Figure 19:
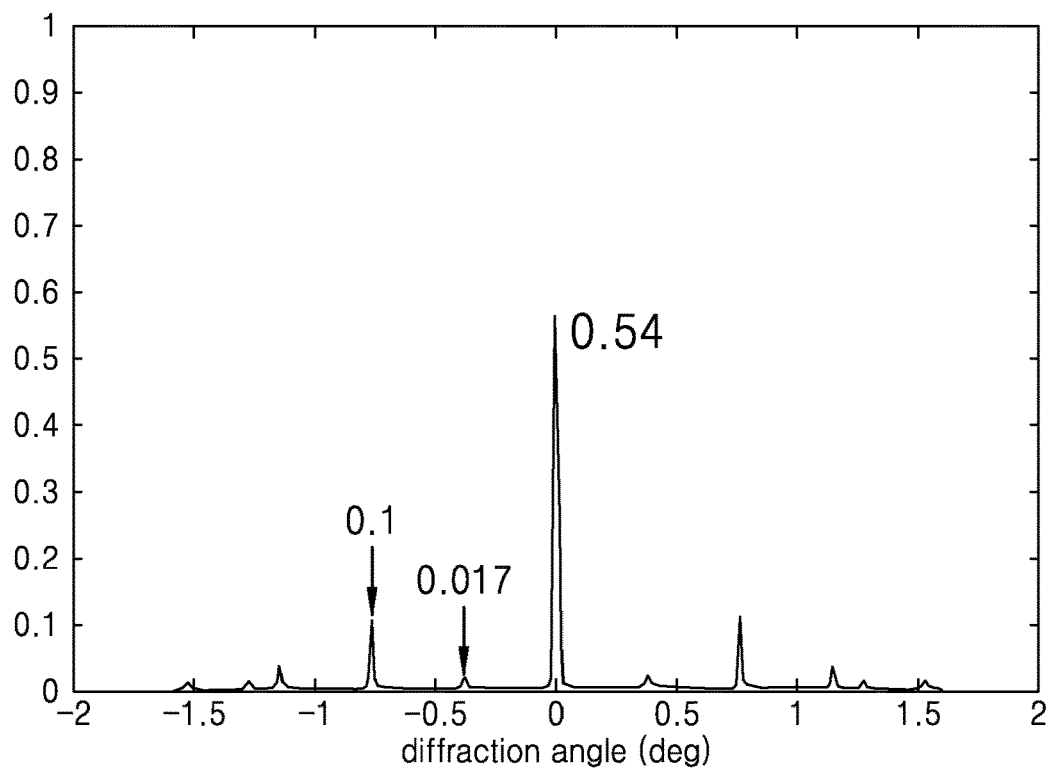

FIGS. 18 and 19 are graphs showing a simulation result of lattice spots formed by the spatial light modulator 120 of FIG. 11. That is, a simulation is performed on the assumption that the mask member 128 including a black mask is disposed on an external surface of the spatial light modulator 120. In FIG. 18, it is assumed that a width of periodic patterns of the mask member 128 is 10 μm that is the same as the pattern width of the black matrix 127, and a space between the mask member 128 and the black matrix 127 is 30 μm, and a space between the mask member 128 and the black matrix 127 in a vertical direction that is a thickness direction of the spatial light modulator 120 is 0.7 μm in consideration of a thickness of a substrate. In FIG. 19, it is assumed that the width of periodic patterns of the mask member 128 is 20 μm that is different from the pattern width of the black matrix 127, and the space between the mask member 128 and the black matrix 127 is 25 μm, and the space between the mask member 128 and the black matrix 127 in the vertical direction is 0.7 μm.

Referring to the graph of FIG. 18, the same like in FIG. 16, a light intensity of a lattice spot caused by a 0$^{th}$ order diffraction is reduced to about 0.8, and lattice spots caused by a higher order diffraction than ±1$^{st}$ appear order at an interval of about ±0.8 degree. Thus, a width of a viewing window may be expanded by 2 times. Referring to the graph of FIG. 19, the light intensity of the lattice spot caused by the 0$^{th}$ order diffraction is further reduced to about 0.54, and the lattice spots caused by the higher order diffraction than ±1$^{st}$ order appear at an interval of about ±0.8 degree. Thus, the width of the viewing window may be expanded by 2 times. However, one diffraction pattern having a very weak light intensity may remain in the viewing window in FIG. 19.

Figure 20:
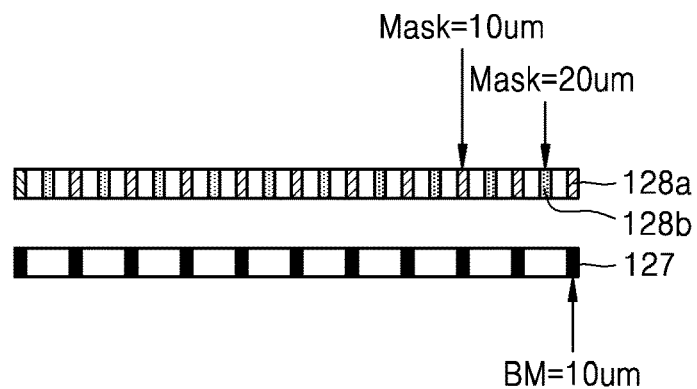
FIG. 20 is a cross-sectional view schematically showing a relative location relationship between black matrixes and mask members according to another exemplary embodiment.

FIG. 20 is a cross-sectional view schematically showing a relative location relationship between the black matrixes 127 and the mask members 128 according to another exemplary embodiment. The mask members 128 may be disposed on an external surface of the spatial light modulator 120 as shown in FIG. 11. The mask members 128 of FIG. 20 may include first patterns 128a having a pattern width as that of the black matrixes 127 and second patterns 128b having a different pattern width from that of the black matrixes 127. The first patterns 128a may be aligned with the patterns of the black matrixes 127 in a longitudinal direction. When viewed from the top, the second patterns 128b may appear as being formed between the first patterns 128a in the longitudinal direction.

Figure 21:
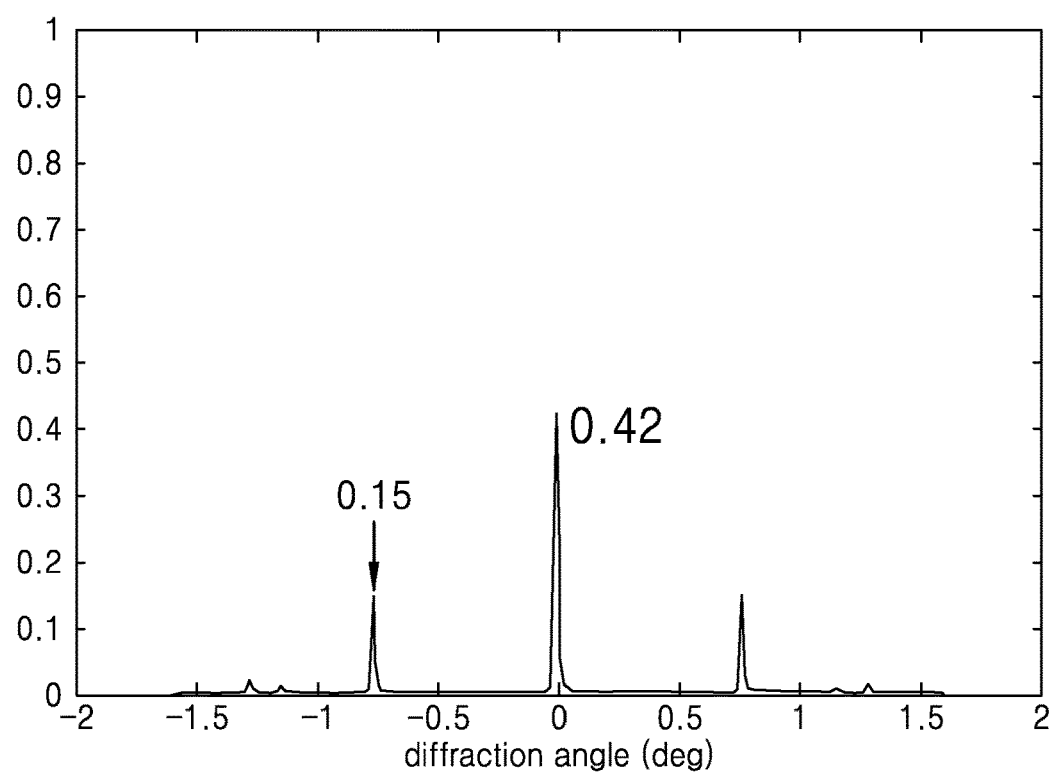
FIG. 21 is a graph showing a simulation result of lattice spots formed by black matrixes and mask members of FIG. 20.

FIG. 21 is a graph showing a simulation result of lattice spots formed by the black matrixes 127 and the mask members 128 of FIG. 20. In FIG. 21, it is assumed that a pattern width of the black matrixes 127 and the first patterns 128a is 10 μm, and a pattern width of the second patterns 128b is 20 μm. It is also assumed that a space between the black matrixes 127 and the mask members 128 in a vertical direction is 0.7 mm. Referring to the graph of FIG. 21, a light intensity of a lattice spot caused by a 0$^{th}$ order diffraction is reduced to about 0.42, and lattice spots caused by a ±1$^{st}$ order diffraction appear at about ±0.8 degree. Thus, in this case, a width of a viewing window may also be expanded 2 times. No diffraction pattern may be present in the viewing window.

Figure 22:
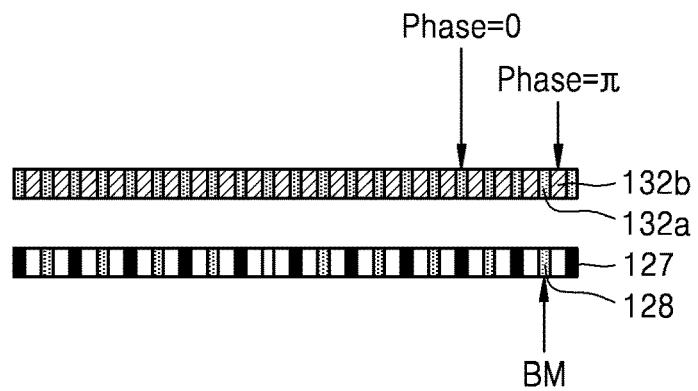
FIG. 22 is a cross-sectional view schematically showing a relative location relationship between black matrixes and mask members according to another exemplary embodiment.

FIG. 22 is a cross-sectional view schematically showing a relative location relationship between the black matrixes 127, the mask members 128 including black masks, and the mask members 132 including phase mask according to another exemplary embodiment. The mask members 128 including the black mask may be disposed on the same layer as the black matrixes 127 inside the spatial light modulator 120. The mask members 132 including the phase mask may be disposed on an external surface of the spatial light modulator 120. A pattern width of the mask members 128 may be the same as that of the black matrixes 127. The mask members 132 may include first refractive index area 132a having a phase delay of 0 and second refractive index areas 132b having a phase delay of π. A width of the first refractive index area 132a may be the same as the pattern width of the black matrixes 127. When seen from a vertical direction, the first refractive index area 132a may appear as being formed t locations identical to those of periodic patterns of the black matrixes 127 and the mask members 128.

Figure 23:
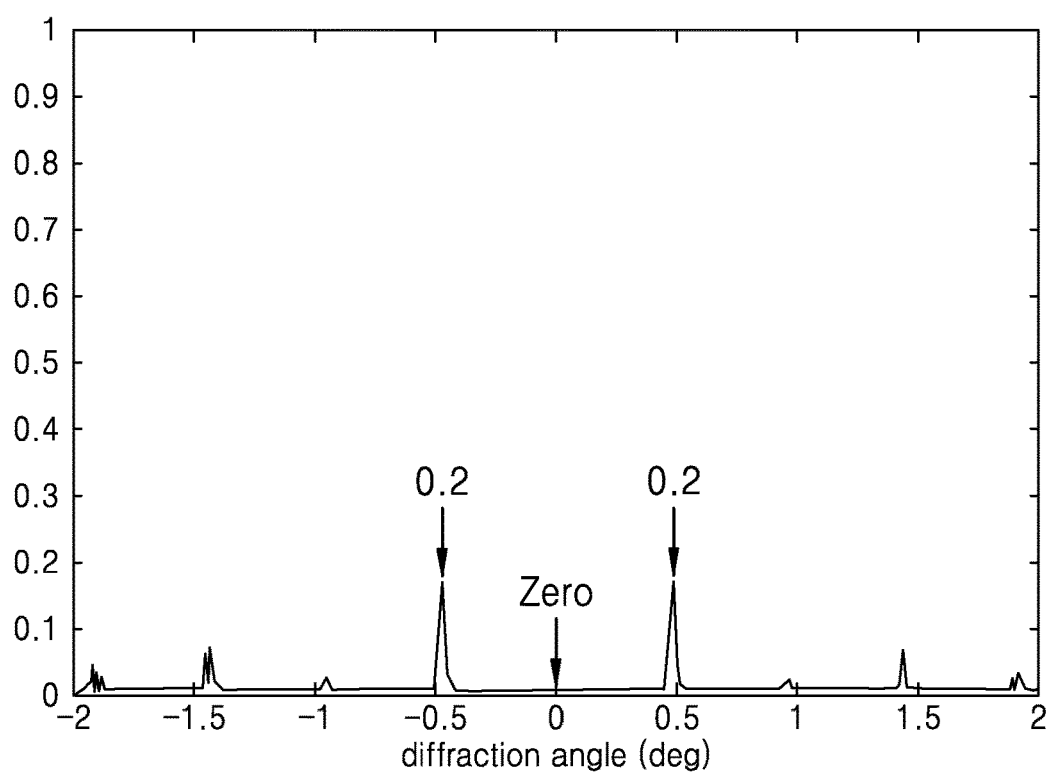
FIG. 23 is a graph showing a simulation result of lattice spots formed by black matrixes and mask members of FIG. 22.

FIG. 23 is a graph showing a simulation result of lattice spots formed by the black matrixes 127 and the mask members 128 and 132 of FIG. 22. It is assumed that a pattern width of the black matrixes 127, a pattern width of the mask members 128, and a width of the first refractive index area 132a of the mask members 132 are 10 μm, and a space between the black matrixes 127 and the mask members 132 in a vertical direction is 0.7 mm. Referring to the graph of FIG. 23, no 0$^{th}$ order diffraction light is present, and lattice spots caused by a ±1$^{st}$ order diffraction appear at about ±0.4 degree. Thus, in this case, a width of a viewing window may also be expanded by 2 times. No diffraction pattern may be present in the viewing window.

To facilitate understanding of the present disclosure, the exemplary embodiments of a spatial light modulator providing an expanded viewing window and a holographic display apparatus including the spatial light modulator have been described and shown in the accompanying drawings. However, the foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A spatial light modulator comprising:
a two-dimensional (2D) array of a plurality of pixels, each of the plurality of pixels having a single liquid crystal cell and a driving circuit configured to drive the liquid crystal cell;
a black matrix comprising a plurality of first strips that are arranged to surround boundaries of the plurality of pixels to define an area of the liquid crystal cell of each of the plurality of pixels;
a mask member that is disposed on a same layer on which the black matrix is disposed, and comprises a plurality of second strips; and
an additional mask member disposed on an external surface of the spatial light modulator,
wherein the plurality of second strips of the mask member have a periodic opaque pattern to block the transmittance light, and have a periodic pattern to split the defined area of the liquid crystal cell of each of the plurality of pixels into at least two sub-areas,
wherein the defined area of the liquid crystal cell of each of the plurality of pixels is surrounded by four surrounding strips of the first plurality of strips of the black matrix,
wherein a plurality of parallel strips among the plurality of second strips of the mask member are disposed to be apart from each other,
wherein the additional mask member comprises a periodic phase delay pattern that delays the phase of the transmittance light,
wherein a pattern pitch of the periodic opaque pattern and a pattern pitch of the periodic phase delay pattern are of a same pattern pitch, and
wherein the periodic opaque pattern and the periodic phase delay pattern are disposed in different layers.

2. The spatial light modulator of claim 1, wherein a pattern pitch of the periodic pattern of the plurality of second strips of the mask member is equal to a pixel pitch of the plurality of pixels.

3. The spatial light modulator of claim 1, wherein a pattern pitch of the periodic pattern of the mask member is substantially equal to 1/N of a pixel pitch of the plurality of pixels, N being an integer value.

4. The spatial light modulator of claim 1, wherein the periodic pattern of the mask member has a first pattern pitch in a first direction and a second pattern pitch in a second direction perpendicular to the first direction.

5. The spatial light modulator of claim 4, wherein a ratio between the first pattern pitch of the periodic pattern of the mask member and a pixel pitch of the plurality of pixels in the first direction is substantially equal to a ratio between the second pattern pitch of the periodic pattern of the mask member and a pixel pitch of the plurality of pixels in the second direction.

6. The spatial light modulator of claim 4, wherein a ratio between the first pattern pitch of the periodic pattern of the mask member and a pixel pitch of the plurality of pixels in the first direction is different from a ratio between the second pattern pitch of the periodic pattern of the mask member and a pixel pitch of the plurality of pixels in the second direction.

7. The spatial light modulator of claim 4, wherein the first pattern pitch of the periodic pattern of the mask member is substantially equal to one over an integer of a pixel pitch of the plurality of pixels in the first direction, and the second pattern pitch of the periodic pattern of the mask member is substantially equal to 1/N of a pixel pitch of the plurality of pixels in the second direction, N being an integer value.

8. The spatial light modulator of claim 1, wherein a pattern width of the mask member is substantially equal to a pattern width of the black matrix.

9. The spatial light modulator of claim 1, wherein the periodic pattern of the mask member is arranged between patterns of the black matrix and extends parallel in at least one direction to the patterns of the black matrix.

10. The spatial light modulator of claim 1, wherein a respective one of the plurality of second strips of the mask member is disposed in each of the plurality of pixels.

11. The spatial light modulator of claim 1, wherein the black matrix is disposed to face the driving circuit of each of the plurality of pixels and the plurality of second strips of the mask member are disposed to partially cover the liquid crystal cell of each of the plurality of pixels.

12. The spatial light modulator of claim 1, wherein the additional mask member comprises a transparent film on which a periodic pattern is printed.

13. The spatial light modulator of claim 1, wherein the additional mask member comprises a first area having a first thickness and a second area having a second thickness different from the first thickness.

14. The spatial light modulator of claim 1, wherein the additional mask member comprises a first area having a first refractive index and a second area having a second refractive index different from the first refractive index.

15. A holographic display apparatus comprising:
a light source configured to emit light;
a spatial light modulator that comprises an array of a plurality of pixels and is configured to diffract the light incident on the spatial light modulator to reproduce a hologram image, wherein each of the plurality of pixels has a singe liquid crystal cell and a driving circuit configured to drive the liquid crystal cell;
a black matrix comprising a plurality of first strips that are arranged to surround boundaries of the plurality of pixels to define an area of the liquid crystal cell of each of the plurality of pixels;
a mask member that is disposed on a same layer on which the black matrix is disposed, and comprises a plurality of second strips; and
an additional mask member disposed on an external surface of the spatial light modulator,
wherein the plurality of second strips of the mask member have a periodic opaque pattern to block the transmittance light, and have a periodic pattern to split the defined area of the liquid crystal cell of each of the plurality of pixels into at least two sub-areas,
wherein the defined area of the liquid crystal cell of each of the plurality of pixels is surrounded by four surrounding strips of the first plurality of strips of the black matrix,
wherein a plurality of parallel strips among the plurality of second strips of the mask member are disposed to be apart from each other,
wherein the additional mask member comprises a periodic phase delay pattern that delays the phase of the transmittance light,
wherein a pattern pitch of the periodic opaque pattern and a pattern pitch of the periodic phase delay pattern are of a same pattern pitch, and
wherein the periodic opaque pattern and the periodic phase delay pattern are disposed in different layers.

16. The holographic display apparatus of claim 15, wherein a pattern pitch of the periodic pattern of the mask member is substantially equal to a pixel pitch of the plurality of pixels or 1/N of the pixel pitch of the plurality of pixels, N being an integer value.

17. The holographic display apparatus of claim 15, wherein the periodic pattern of the mask member is arranged between patterns of the plurality of black matrixes and extends parallel in at least one direction to the patterns of the black matrix.

18. The holographic display apparatus of claim 15, wherein the opaque pattern is inside each of the plurality of pixels of the spatial light modulator.

19. The holographic display apparatus of claim 15, wherein the black matrix is disposed to face the driving circuit of each of the plurality of pixels and the plurality of second strips of the mask member are disposed to partially cover the liquid crystal cell of each of the plurality of pixels.

20. The holographic display apparatus of claim 15, wherein the additional mask member has a form of a transparent film on which a periodic pattern is printed.

21. The holographic display apparatus of claim 15, wherein the spatial light modulator and the mask member are configured such that a size of a viewing window defined as a space between a plurality of lattice spots formed by a periodic structure of the spatial light modulator and the mask member is at least 2 times greater than a size of an image window of the hologram image reproduced by the holographic display apparatus.

* * * * *